(12) United States Patent
Kusunoki

(10) Patent No.: US 9,215,118 B2
(45) Date of Patent: Dec. 15, 2015

(54) COMMUNICATION METHOD AND TRANSMISSION APPARATUS

(71) Applicant: Sony Mobile Communications, Inc., Tokyo (JP)

(72) Inventor: Shigeo Kusunoki, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 126 days.

(21) Appl. No.: 14/080,861

(22) Filed: Nov. 15, 2013

(65) Prior Publication Data

US 2014/0140195 A1    May 22, 2014

Related U.S. Application Data

(60) Provisional application No. 61/727,983, filed on Nov. 19, 2012.

(51) Int. Cl.
| | |
|---|---|
| *H04L 27/26* | (2006.01) |
| *H04L 25/03* | (2006.01) |
| *H04L 5/00* | (2006.01) |
| *H04B 7/06* | (2006.01) |

(52) U.S. Cl.
CPC ............ *H04L 27/2602* (2013.01); *H04B 7/068* (2013.01); *H04L 5/0078* (2013.01); *H04L 25/03343* (2013.01); *H04L 27/2634* (2013.01); *H04L 27/2655* (2013.01)

(58) Field of Classification Search
CPC .............. H04L 27/2602; H04L 5/0078; H04L 27/2634; H04L 27/2655; H04L 25/03343; H04B 7/068
See application file for complete search history.

(56) References Cited

U.S. PATENT DOCUMENTS

| 5,684,794 A * | 11/1997 | Lopez et al. ............... 370/337 |
| 7,082,451 B2 * | 7/2006 | Kulkarni et al. ............ 708/404 |
| 2006/0198472 A1 * | 9/2006 | Nakamura et al. ........... 375/343 |
| 2007/0037519 A1 | 2/2007 | Kim et al. |

(Continued)

FOREIGN PATENT DOCUMENTS

| JP | 2003-338779 | 11/2003 |
| JP | 2006-295629 | 10/2006 |

(Continued)

OTHER PUBLICATIONS

Jian Liu, et al. OFDM-MIMO WLAN AP Front-end Gain and Phase Mismatch Calibration, Radio and Wireless Conference, 2004 IEEE, XP010764572, Sep. 19-22, 2004, pp. 151-154.

*Primary Examiner* — Mohammad Anwar
(74) *Attorney, Agent, or Firm* — Oblon, McClelland, Maier & Neustadt, L.L.P.

(57) ABSTRACT

An electronic device that performs an inverse fast Fourier transform (IFFT) on N (N is an integer equal to or larger than 2) orthogonal frequency-division multiplexed (OFDM) transmission signals; performs a fast Fourier transform (FFT) on the N transmission signals which have been subjected to the IFFT; detects phases of the N transmission signals which have been subjected to the FFT; detects relative delay amounts of the N transmission signals based on the detected phases of the N transmission signals; and adjusts a timing at which at least one of the N transmission signals is subjected to the inverse fast Fourier transform based on the detected relative delay amounts.

17 Claims, 13 Drawing Sheets

(56) References Cited

U.S. PATENT DOCUMENTS

2008/0107158 A1* 5/2008 Yoshii et al. .................. 375/146
2011/0317640 A1* 12/2011 Kawamura et al. ........... 370/329

FOREIGN PATENT DOCUMENTS

| JP | 2010-130246 | 6/2010 |
| JP | 2012503429 A | 2/2012 |

* cited by examiner

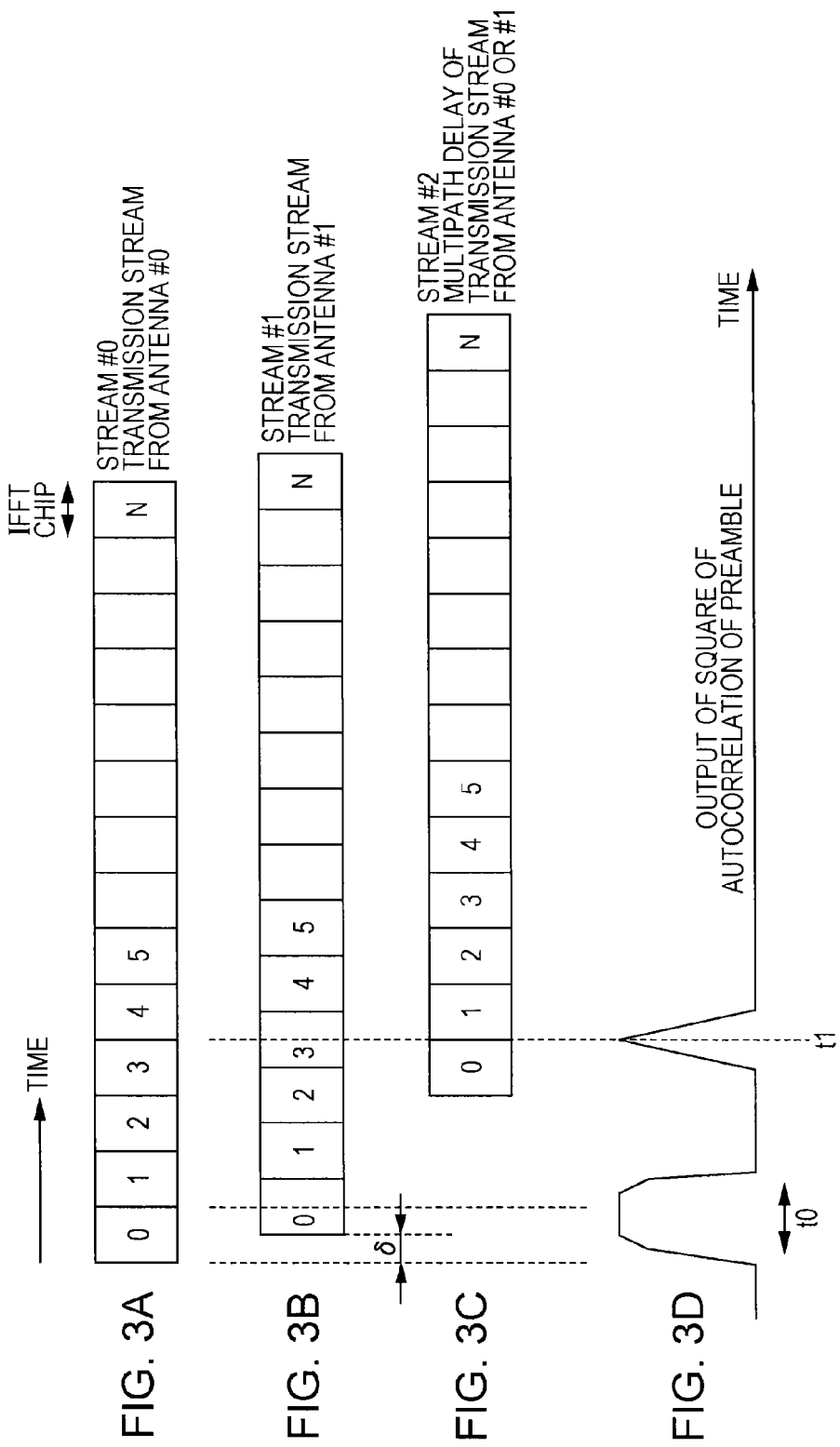

FIG. 4A
RECEPTION PATH #0
| DATA #0 | GI |
DELAY: δ
| PILOT #0 | GI |
PERIOD a
FIG. 4B
RECEPTION PATH #1
| DATA #0 | PILOT #1 | GI |
GI
PERIOD b
DEMODULATION SECTION  δ
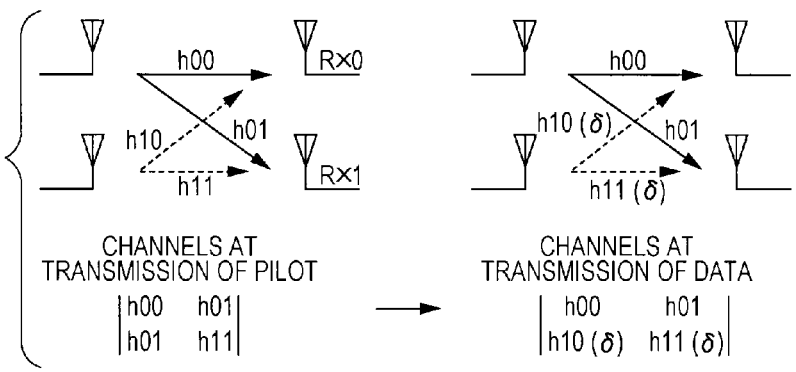
FIG. 5
CHANNELS AT TRANSMISSION OF PILOT
$\begin{vmatrix} h00 & h01 \\ h01 & h11 \end{vmatrix}$
CHANNELS AT TRANSMISSION OF DATA
$\begin{vmatrix} h00 & h01 \\ h10(\delta) & h11(\delta) \end{vmatrix}$
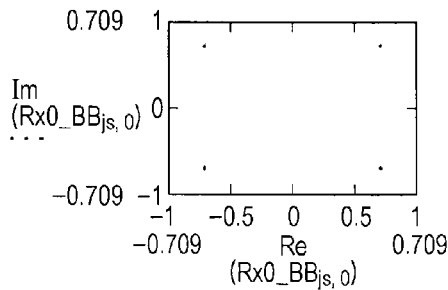
FIG. 6A
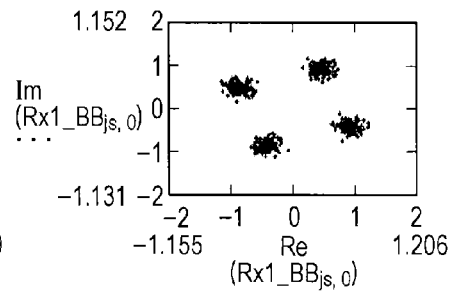
FIG. 6B

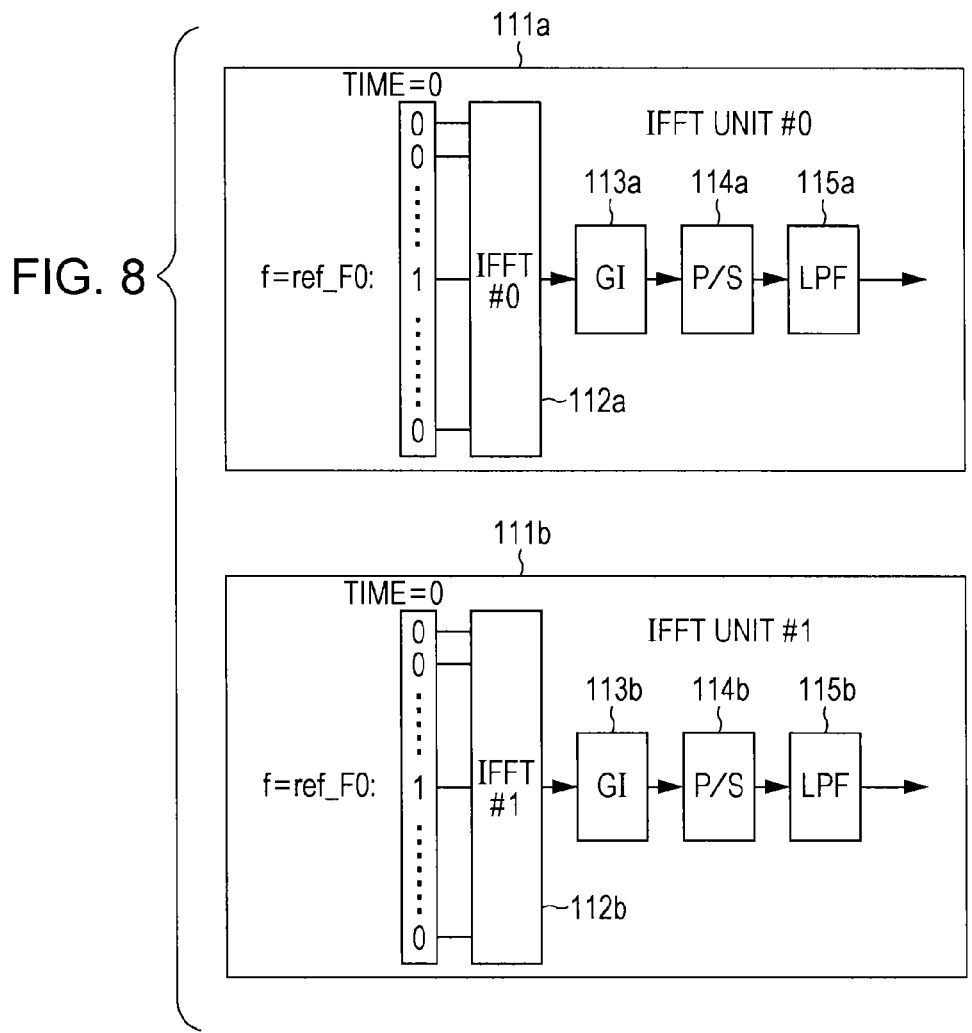
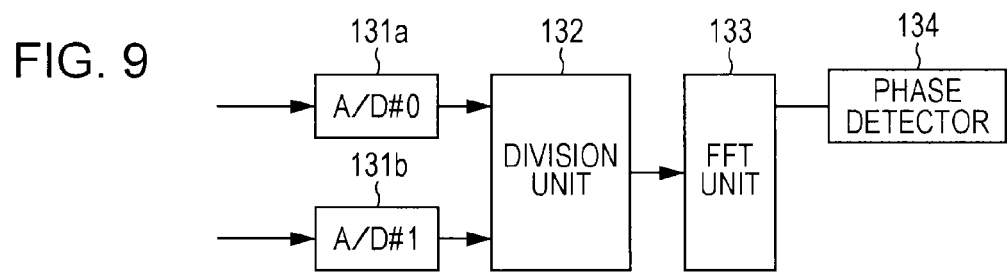

COMMUNICATION METHOD AND TRANSMISSION APPARATUS

CROSS REFERENCE TO RELATED APPLICATION

The present application claims the benefit of the earlier filing date of U.S. Provisional Patent Application Ser. No. 61/727,983 filed on Nov. 19, 2012, the entire contents of which is incorporated herein by reference.

BACKGROUND

1. Field of the Disclosure

The present disclosure relates to a communication method for wirelessly transmitting a signal which has been modulated by an OFDM (Orthogonal Frequency Division Multiplexing) method or an SC-FDMA (Single-Carrier Frequency-Division Multiple Access) method and a transmission apparatus employing the communication method.

2. Description of Related Art

Hitherto, high-speed communication employing a modulation method using OFDM such as LTE (Long Term Evolution) or WiMAX (Worldwide Interoperability for Microwave Access) has been put into practical use. OFDM has a guard interval, and therefore, has ability to particularly address frequency selective multipath, and MIMO (multiple-input and multiple-output) is more easily implemented when compared with other modulation methods. Specifically, since signal processing is easily performed in a frequency domain using the FFT (Fast Fourier Transform), estimation of a complicated channel matrix and signal separation are easily performed. As an applied technology thereof, multiuser MIMO (MU-MIMO) for communication between a single base station and a plurality of terminals using the same frequency has been discussed.

MIMO is used for communication from a base station, that is, used for a downlink. However, a case where MIMO is used for transmission from a mobile terminal (an uplink) in the future has been discussed. MIMO realizes high-speed communication by transmitting different signals in parallel from different antennas. However, here, it is assumed that all the signals are not delayed from one another and precisely coincide with one another in terms of time. The coincidence is realized by high-accuracy implementation of hardware in a base station. However, when MIMO transmission is performed by a mobile terminal, the precise coincidence in terms of time for individual transmission paths in the terminal is not easily realized. In a mobile terminal, high-accuracy synchronization technique is not employed due to constraint of a size and power consumption. Furthermore, in the MU-MIMO, relative delays of transmissions from terminals make MIMO transmission difficult.

In a case of reception in the OFDM, an FFT frame should be reliably detected. A case where the frame detection fails will be discussed. When FFT is performed before an original start point of a frame, orthogonality of subcarriers after the FFT is maintained if the original start point of the frame is within a guard interval. However, in this case, a guard interval length is deteriorated and desired avoidance of multipath is not performed. On the other hand, if a start timing of the FFT is delayed from the original start point of the frame, intersymbol interference occurs in a tail portion of a signal stream and the orthogonality of subcarriers is not maintained.

Therefore, ingenious synchronization acquisition is applied to a receiver. FIG. 1 is a diagram illustrating a reception apparatus 10 which employs a modulation method using the OFDM and which performs MIMO transmission.

A reception apparatus 10 of FIG. 1 has two reception paths #0 and #1. The reception path #0 has a high-frequency unit (hereinafter referred to as an "RF unit") 12a connected to an antenna 11a. A signal received by the RF unit 12a is converted into digital data by an analog/digital converter 13a. The data converted by the analog/digital converter 13a is supplied through a matched filter 14a to a correlation detector 15. The matched filter 14a detects a preamble. The correlation detector 15 detects a head position (synchronization point) of an FFT frame using autocorrelation or cross-correlation. In accordance with the head position of the FFT frame detected by the correlation detector 15, a guard interval removal unit 16a removes a guard interval from the received FFT frame.

Data from which the guard interval is removed by the guard interval removal unit 16a is supplied to an FFT unit 17a which extracts data modulated into subcarriers and supplies the extracted reception data of the path #0 to a reception data processor 18.

The reception path #1 has the same configuration as the reception path #0. Specifically, a signal received by an RF unit 12b connected to an antenna 11b is supplied to an analog/digital converter 13b, a matched filter 14b, the correlation detector 15, a guard interval removal unit 16b, and an FFT unit 17b in this order, and reception data of the path #1 is supplied to the reception data processor 18.

SUMMARY

As illustrated in FIG. 1, in the MIMO reception apparatus, calculation of the autocorrelation or the cross-correlation is performed by the correlation detector 15 by collecting signals of the reception branches. Such a process is performed assuming that timings and frequencies of signals supplied from a plurality of antennas on a transmission side precisely coincide with one another.

However, it is expected that precision of timings and frequencies of signals supplied from a plurality of antennas on a transmission side is not maintained when MIMO transmission is performed on an uplink from here on. Specifically, in a case where a mobile terminal performs MIMO transmission, transmission signals output from a transmission data processing system included in the mobile terminal may differently delay when arriving at antennas of channels and synchronization between the antennas is not realized. Examples of elements of the different delays include a difference of group delays of power amplifiers, a difference of group delays of transmission bandpass filters, and a difference of group delays of various notch filters and matching circuits.

For example, in a case of power amplifiers, different group delays are obtained depending on active elements included in the amplifiers. Furthermore, even in a case of power amplifiers having the same configuration, different group delays are obtained depending on temperature or applied voltages. Between two antennas, a difference between group delays is several n seconds.

A group delay of a transmission bandpass filter is approximately 10 n seconds, and considerably depends on a passband or an ambient temperature.

Performances of various notch filters considerably depend on performances of used components. A determination as to whether the various notch filters are to be provided to suppress pre-interference components to other bands is made depending on individual situations of paths. A matching circuit is provided taking characteristics of elements into consideration so as to satisfy characteristics among the elements. A configuration and the number of components of the matching circuit are not fixed and matching circuits of two paths should have different configurations in many cases. In this case, if a delay amount is recognized in advance, a phase correction may be performed for recovery. However, in general, different mobile terminals have different delay amounts and a delay amount changes depending on temperature or with age, and accordingly, it is difficult to estimate a delay amount. Furthermore, a relative delay may occur between two transmission paths depending on ambient environment of antennas of a mobile terminal. The term "ambient environment" here means influence from a body of a person who has the mobile terminal, for example.

When 2×2 MIMO reception is performed, a difference of a transmission delay between two antennas when the two antennas of a mobile terminal is viewed from a base station may be ignored. However, multi-paths having extremely similar transmission distances may be expected and a relative delay of the multi-paths may be generated.

Accordingly, approximately 20 n seconds of a relative delay should be assumed at maximum, and the value is shorter than a unit time of the fast Fourier transform (FFT) in a case of the LTE since a unit time length for performing the FFT is approximately 32 n seconds. The time detection will now be described.

FIG. 2 is a diagram illustrating characteristics of the square of autocorrelation of a Zadoff-chu system (one of CAZAC systems: Constant Amplitude Zero Auto-Correlation) used in the LTE. In FIG. 2, an axis of abscissa denotes a unit time of IFFT (Inverse Fast Fourier Transform). For example, when an IFFT size is 1000, numbers from 1 to 1000 are shown. In this specification, the unit time representing the IFFT size is referred to as an "IFFT chip" (or simply referred to as a "chip").

In FIG. 2, a timing of 0 at the center of the axis of abscissa corresponds to a state in which the square of the autocorrelation is not shifted at all. In FIG. 2, an amplitude of a reception signal in the state in which the square of autocorrelation is not shifted at all is determined to be 0 dB. Change of a shift represents a state of attenuation of a reception signal.

As illustrated in FIG. 2, when the square of the autocorrelation is obtained and the time unit of the IFFT is shifted by one (one chip shift of the IFFT), a reception signal is attenuated by approximately 4 dB. Furthermore, the time unit is shifted by two chips, the reception signal is attenuated by 20 dB or more. Accordingly, when the time unit is shifted by one chip or more, an attenuation amount is large and the IFFT chip can be specified at high accuracy.

FIGS. 3A-3D illustrate specifying of an FFT frame of a reception signal when the square of autocorrelation is employed.

FIGS. 3A-3C represent images of reception streams which have been subjected to IFFT. Numbers in the streams represent numbers of IFFT chips.

Stream #0 of FIG. 3A and stream #1 of FIG. 3B reach reception ends at substantially the same time and a relative delay is δ which is within one chip. A difference of the relative delay is not specified by a reception side. Stream #2 of FIG. 3C is delayed due to multipath, and one of two transmission antennas which transmits the stream #2 is not identified. In FIG. 3C, the stream #2 is delayed by three IFFT chips, and a head of the stream #2 coincides with a head of one of IFFT chips of the stream #0 by chance.

FIG. 3D shows an output of a correlator in a case where these signals are received and an FFT frame is detected using autocorrelation of a preamble. Since correlated calculation is performed in a unit of IFFT chip, a time shift within one chip is not reliably detected. In FIG. 3D, a time point t0 when the streams #0 and #1 are to be detected and in which the output of the correlator is high has a width.

A receiver is not capable of specifying a factor of such a relative delay. Such a width deteriorates accuracy of synchronization acquisition. As for the stream #2, a head can be reliably detected by the output of the correlator at the time point t1.

In order to correct the relative delay, Japanese Unexamined Patent Application Publication No. 2006-295629 describes a method for cancelling a relative delay by detecting a phase difference of RF carriers, for example. Furthermore, Japanese Unexamined Patent Application Publication No. 2012-503429 describes a method for correcting a relative delay using initial synchronization of preambles in the MU-MIMO. However, more reliable correction of a relative delay is desired.

Furthermore, channel estimation is also a problem to be solved.

In MIMO, channels are represented by determinant of matrix (hereinafter referred to as an "H-matrix"). An H-matrix is estimated using a pilot signal included in a transmission signal and the signal is separated. Here, there arises a problem in that, when FFT frames of transmission signals shift from one another due to a relative delay, if the FFT frames are fixed to a certain point, pilot signals are not reliably demodulated. The pilot signals are arranged so that frequencies and time frames of the OFDM are not overlapped with one another in a plurality of transmission paths. Therefore, if FFT frames including pilot signals are specified by a certain method, the pilot signals are reliably obtained.

Specifically, in a reception path #0 illustrated in FIG. 4A and a reception path #1 illustrated in FIG. 4B, FFT frames including pilot signals are arranged at different timings. Here, "GI" denotes a guard interval. In this example, when signals are transmitted from the two reception paths #0 and #1 on a transmission side, a relative delay is approximately 4 n seconds. Furthermore, in the reception path #0, a period a in which the pilot signal is transmitted is detected and demodulation is performed in synchronization with the timing. Similarly, in the reception path #1, a period b in which the pilot signal is transmitted is detected and demodulation is performed in synchronization with the timing. The transmission signals in this example are modulated by the QPSK (Quadrature Phase Shift Keying).

When the reception illustrated in FIGS. 4A and 4B is performed, channels of the MIMO are represented by a matrix form illustrated in a lower left portion of FIG. 5. In the path #0, "h00" and "h01" are estimated and in the path #1, "h10" and "h11" are estimated. Here, a time delay between the two paths is not reflected on reception pilot signals since frame synchronization is performed. Data reception is now performed, and data is simultaneously transmitted in the two paths in terms of time. The data is demodulated by separating signals of the two paths using an inverse matrix of the H-matrix obtained before. Here, as illustrated in FIGS. 4A and 4B, since delays δ between the paths are included in the reception data of the two paths, the demodulation is performed taking a phase shift into consideration, and therefore, the signal separation is not reliably performed. Specifically, the signal separation taking the delays δ into consideration is performed using the H-matrix which does not take the delays δ into consideration.

An example of constellation of a result of the reception and the demodulation is shown in FIGS. 6A and 6B. FIG. 6A shows a case of an ideal reception state. In this ideal state, reception symbols are fixed in four positions. On the other hand, when the signal separation taking the delays δ into consideration is performed, positions of reception symbols are not fixed as illustrated in FIG. 6B and demodulation fails.

In addition, optimization by precoding is a further problem to be solved. In the precoding, a communication path capacity of MIMO is determined to be maximum in many cases. In a closed loop, a transmission side is multiplied by a beamforming matrix and a reception side is multiplied by a waveshaping matrix. In the closed loop, a method referred to as CDD (Cyclic Delay Diversity) is used and a method for ensuring a communication path capacity by performing certain phase rotation is employed. In either method, phases of transmission signal streams are controlled. However, when a relative delay described above is generated, an H-matrix appears as phase rotation, and therefore, information on the H-matrix which appears as phase rotation should be taken into consideration.

These problems are solved if the relative delay (δ) is detected. Specifically, when the relative delay (δ) is added to estimation of the H-matrix, channel estimation may be reliably performed. Furthermore, reliably precoding may be performed.

The inventor recognizes necessity of detection of a relative delay when MIMO communication is performed.

According to an exemplary embodiment, the present disclosure is directed to an electronic device that performs an inverse fast Fourier transform (IFFT) on N (N is an integer equal to or larger than 2) orthogonal frequency-division multiplexed (OFDM) transmission signals; performs a fast Fourier transform (FFT) on the N transmission signals which have been subjected to the IFFT; detects phases of the N transmission signals which have been subjected to the FFT; detects relative delay amounts of the N transmission signals based on the detected phases of the N transmission signals; and adjusts a timing at which at least one of the N transmission signals is subjected to the inverse fast Fourier transform based on the detected relative delay amounts.

According to the present disclosure, relative delays within one IFFT chip which are generated among a plurality of transmission streams in the MIMO may be detected. This is considerably effective.

BRIEF DESCRIPTION OF DRAWINGS

FIGS. 3A-3D illustrate a transmission state of MIMO.

FIGS. 4A-4B illustrate a delay generation state of signals of two reception paths.

FIG. 5 is a diagram illustrating channel estimation of the MIMO.

FIGS. 6A-6B illustrate a reception state of the MIMO when a transmission delay is generated in channels.

FIG. 8 includes block diagrams illustrating configurations of IFFT units according to the first embodiment of the present disclosure.

FIG. 9 is a block diagram illustrating a configuration of a delay detector according to the first embodiment of the present disclosure.

DETAILED DESCRIPTION

Embodiments of the present disclosure will be described hereinafter in the following order.
1. First Embodiment
1-1. Example of Configuration of Transmission Apparatus (FIG. 7)
1-2. Examples of IFFT Units (FIG. 8)
1-3. Example of Delay Detector (FIG. 9)
1-4. Example of Delay Correction Operation
2. Second Embodiment
2-1. Examples of IFFT Units (FIG. 10)
2-2. Example of Delay Detector (FIG. 11)
2-3. Example of Delay Correction Operation
2-4. Example of Correction of Relative Delay Using Phase Correction Value (FIG. 12)
3. Third Embodiment
3-1. Example of Transmission Apparatus (FIG. 13)
3-2. Examples of IFFT units (FIG. 14)
3-3. Example of Delay Detector (FIG. 15)
3-4. Example of Delay Correction Operation
3-5. Example of Correction of Relative Delay Using Phase Correction Value (FIG. 16)
4. Modifications <1. First Embodiment>
[1-1. Example of Transmission Apparatus]

Figure 1:
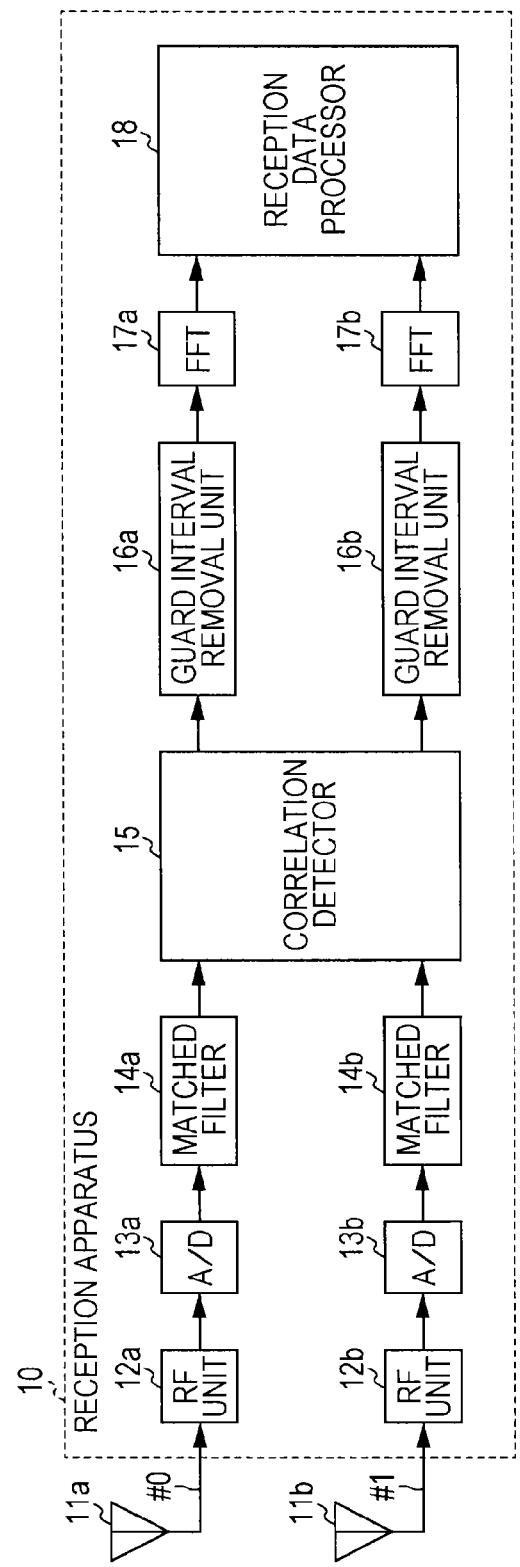
FIG. 1 is a block diagram illustrating a conventional MIMO reception apparatus.
Figure 2:
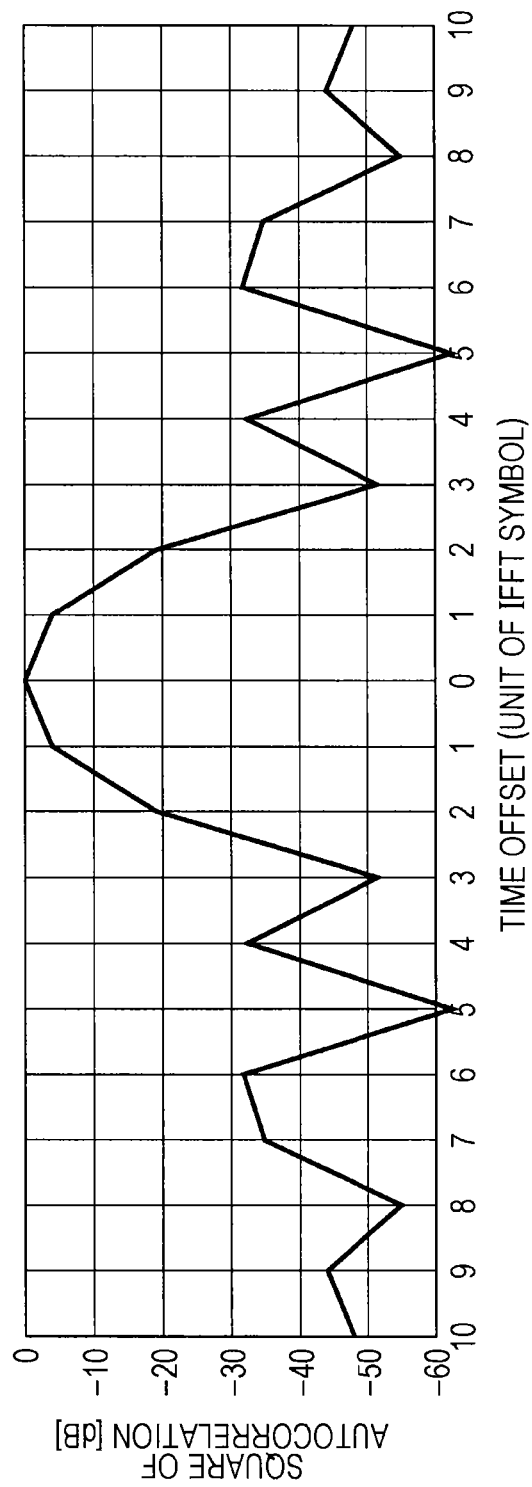
FIG. 2 is a diagram illustrating characteristics of the square of autocorrelation of a reception signal.
Figure 7:
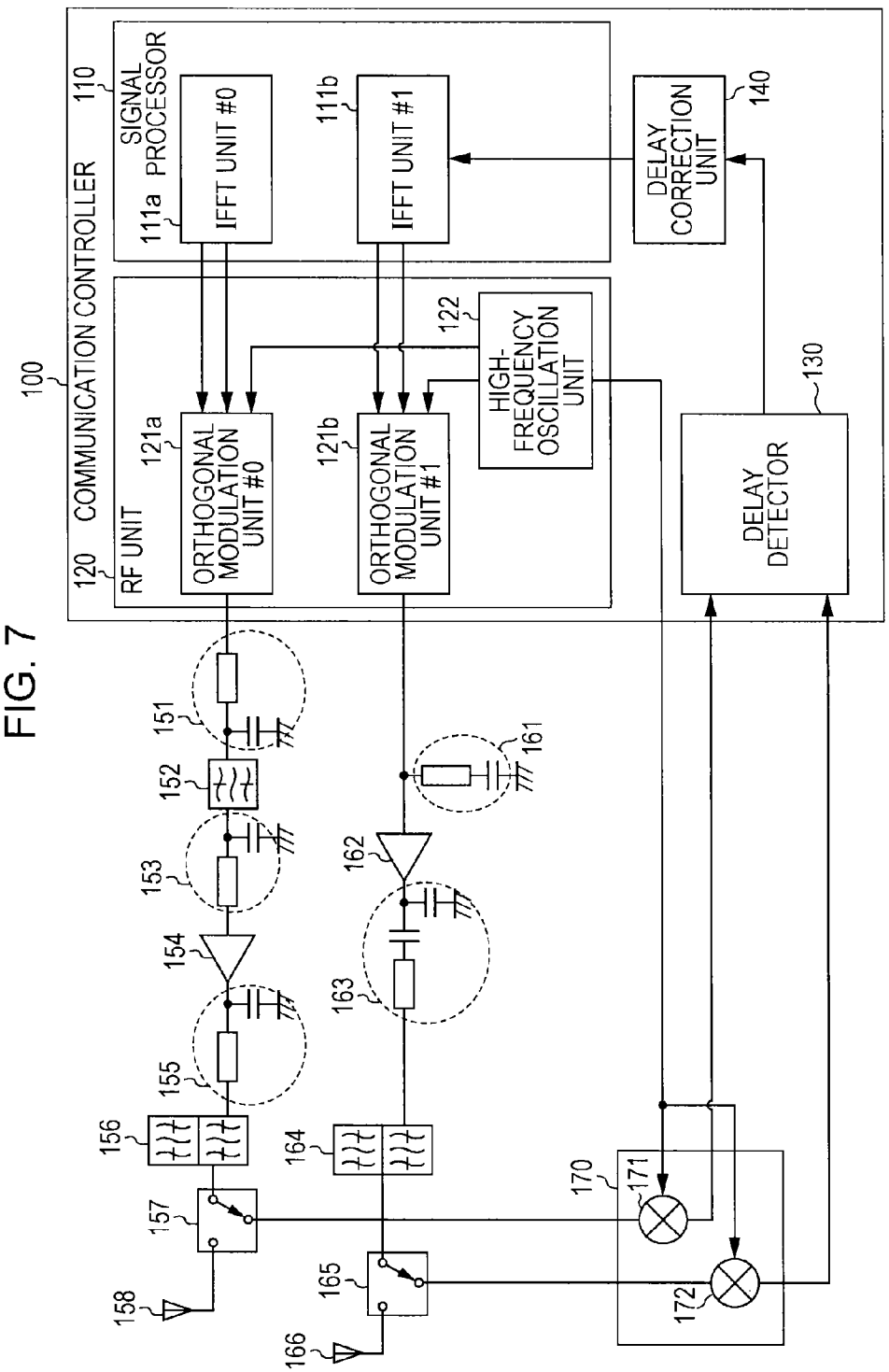
FIG. 7 is a block diagram illustrating a configuration of a transmission apparatus according to a first embodiment of the present disclosure.

FIG. 7 is a diagram illustrating a configuration of a transmission apparatus according to a first embodiment. The transmission apparatus of the present disclosure is a terminal device such as a cellular phone terminal device. Alternatively, the transmission apparatus of the present disclosure may be applied to a base station.

The transmission apparatus of the example of FIG. 7 includes two transmission paths #0 and #1 and performs 2×2 MIMO transmission.

A communication controller 100 includes a signal processor 110 including IFFT units 111a and 111b. Each of the IFFT units 111a and 111b performs the inverse fast Fourier transform of an OFDM method or an SC-FDMA method on a transmission signal. Note that, when a delay is detected as described hereinafter, the IFFT units 111a and 111b are assigned to signals to be subjected to the inverse fast Fourier transform, and signals for delay detection are assigned to predetermined frequency/time slots. The signals for delay detection will be described hereinafter.

The signals which have been subjected to the inverse fast Fourier transform performed by the IFFT units 111a and 111b are supplied to a high-frequency unit (an RF unit) 120. The RF unit 120 includes two orthogonal modulation units 121a and 121b each of which performs orthogonal modulation on a high-frequency signal supplied from a high-frequency oscillator 122 using a transmission signal.

A transmission signal (a high-frequency signal) output from the orthogonal modulation unit 121a of the transmission path #0 is supplied through a transmission processor including a matching circuit and an amplifier to a duplexer 156. In this example, the transmission signal is supplied through three matching circuits 151, 153, and 155, a filter 152, and an amplifier 154 to the duplexer 156. Arrangement of the matching circuits, the filter, and so on is merely an example. The duplexer 156 allows a transmission circuit and a reception circuit to share an antenna. The reception circuit is omitted in FIG. 7.

A transmission signal output from the duplexer 156 is supplied through a switch 157 to an antenna 158. The switch 157 performs switching so as to supply the transmission signal to a demodulation unit 170 when a delay is detected as will be described hereinafter. In normal transmission, the switch 157 connects the duplexer 156 and the antenna 158 with each other.

A transmission signal (a high-frequency signal) output from the orthogonal modulation unit 121b of the transmission path #1 is supplied through a matching circuit, an amplifier, and so on to a duplexer 164. In this example, the transmission signal is supplied through a notch filter 161, an amplifier 162, and a matching circuit 163 to the duplexer 164. Arrangement of the matching circuit, the filter, and so on is merely an example. Furthermore, although the two transmission paths #0 and #1 have different circuit configurations in FIG. 7, the two transmission paths #0 and #1 may have the same circuit configuration.

A transmission signal output from the duplexer 164 is supplied through a switch 165 to an antenna 166. The switch 165 supplies the transmission signal to the demodulation unit 170 when a delay is detected as will be described hereinafter. In normal transmission, the switch 165 connects the duplexer 164 and the antenna 166 with each other.

The demodulation unit 170 includes a mixer 171 which receives the transmission signal supplied from the switch 157 of the transmission path #0 and a mixer 172 which receives the transmission signal supplied from the switch 165 of the transmission path #1. The mixers 171 and 172 receive high-frequency signals supplied from a high-frequency oscillation unit 122 of the RF unit 120 and the transmission signals of the transmission paths are demodulated into baseband signals. Note that the high-frequency signals supplied from the high-frequency oscillation unit 122 to the mixers 171 and 172 are the same as the high-frequency signals used for the modulation performed by the orthogonal modulation units 121a and 121b.

The signals of the transmission paths #0 and #1 demodulated by the mixers 171 and 172 are supplied to a delay detector 130 of the communication controller 100. The delay detector 130 detects signals added to the transmission signals for delay detection and detects a relative delay amount between the two transmission paths #0 and #1 in accordance with a detected phase difference of the signals. The relative delay amount detected by the delay detector 130 is supplied to a delay correction unit 140.

The delay correction unit 140 converts the supplied relative delay amount into a time so as to generate a correction signal for correcting transmission timings of the transmission paths #0 and #1 and supplies the correction signal to the signal processor 110. It is assumed that, according to the relative delay amount supplied from the delay detector 130 to the delay correction unit 140, the signal of the transmission path #1 delays relative to the signal of the transmission path #0 by a delay amount δ. In this case, the delay correction unit 140 issues an instruction for delaying a processing timing by a period of time corresponding to the delay amount δ to the IFFT unit 111a which processes the signal of the transmission path #0.

By performing this process, the timings when the signals are transmitted from the antennas 158 and 166 in the two transmission paths #0 and #1 coincide with each other. Note that, although the two transmission paths are illustrated in FIG. 7, even when three or more transmission paths are provided, relative delays thereof may be detected and corrected.

[1-2. Examples of IFFT Units]

FIG. 8 includes diagrams illustrating configurations of the two IFFT units 111a and 111b.

The IFFT units 111a and 111b include IFFT calculation units 112a and 112b, guard interval addition units 113a and 113b, parallel/serial converters 114a and 114b, and low-pass filters 115a and 115b, respectively. Signals which have been subjected to the inverse fast Fourier transform performed by the IFFT calculation units 112a and 112b are supplied to the guard interval addition units 113a and 113b which perform a process of adding a guard interval to an FFT slot of one unit. Then the parallel/serial converters 114a and 114b perform a process of converting a signal into a serial signal, and the low-pass filters 115a and 115b remove unnecessary components.

The signals are supplied to the IFFT calculation units 112a and 112b illustrated in FIG. 8 from the communication controller 100 at a time of delay detection. Specifically, at the time of delay detection, in the IFFT calculation unit 112a of the path #0, a reference signal for delay detection "1" is assigned to a predetermined frequency component ref_F0 and a reference signal "0" is assigned to other frequency components. Similarly, in the IFFT calculation unit 112b of the path #1, the reference signal for delay detection "1" is assigned to a predetermined frequency component ref_F0 and the signal "0" is assigned to other frequency components. The reference signal "1" for delay detection is assigned to the two paths #0 and #1 in the same time slot. The reference signals have the same amplitude.

When the signal "1" is thus assigned to the only one frequency component ref_F0 and the inverse fast Fourier transform is performed, a sine wave having the frequency component ref_F0 appears in outputs of the IFFT calculation units 112a and 112b.

[1-3. Example of Configuration of Delay Detector]

FIG. 9 is a diagram illustrating a configuration of the delay detector 130.

The delay detector 130 includes analog/digital converters 131a and 131b which individually convert baseband signals supplied from the mixers 171 and 172 of the demodulation unit 170, respectively, into digital signals. The signals subjected to the digital conversion performed by the analog/digital converters 131a and 131b are supplied to a division unit 132. The division unit 132 performs division using the two signals. Then a result of the division output from the division unit 132 is supplied to an FFT unit 133.

The FFT unit 133 performs a guard interval removal process and a serial/parallel conversion process before performing the fast Fourier transform.

Then the signal which has been subjected to the fast Fourier transform performed by the FFT unit 133 is supplied to a phase detector 134. The phase detector 134 extracts phase information included in the frequency component ref_F0 and determines that the phase information corresponds to a relative delay amount between the two paths #0 and #1.

[1-4. Example of Delay Correction Operation]

Next, an operation of detecting a relative delay performed by the delay detector 130 will be described.

When the IFFT units 111a and 111b perform the inverse fast Fourier transform on the reference signals for delay detection, the same sine wave is superposed on the transmission signals of the paths #0 and #1 and the transmission signals are amplified. The reference signals included in the transmission signals are converted into sine waves having the frequency ref_F0 component through conversion into baseband signals performed by the demodulation unit 170. The sine wave signals are digitalized by the delay detector 130 and subjected to the division.

Here, signal components of the paths #0 and #1 output from the mixers 171 and 172 of the demodulation unit 170 are represented by Equations (1) and (2) below.

$$\text{Output of MIX\#0} = A0 * \exp(j*2*\pi*\text{ref\_}F0*t + j*\phi 0) \quad \text{Equation (1)}$$

$$\text{Output of MIX\#1} = A1 * \exp(j*2*\pi*\text{ref\_}F0*t + j*\phi 1) \quad \text{Equation (2)}$$

Accordingly, a result of the division is represented by Equation (3).

$$\text{Output of Division Unit} = (A0/A1) * \exp(j*(\phi 0 - \phi 1)) \quad \text{Equation (3)}$$

Note that "φ0" and "φ1" represent phase changes during transmission of the reference signals from an output port of the RF unit 120 of the communication controller 100 to the division unit 132 of the communication controller 100 and include a path difference between the two signals. Furthermore, "A0" and "A1" represent amplitude. The two signals have different amplitudes since gains of the two paths are different from each other.

When the FFT unit 133 performs the fast Fourier transform on a result of Equation (3) which is an output from the division unit 132, Equation (3) appears in the frequency component ref_F0 of the FFT unit 133 and the phase detector 134 can detect a phase thereof If a relative delay is generated between the two path #0 and #1, a phase difference (φ0−φ1) does not become zero but if a relative delay is not generated, the phase difference becomes zero.

A timing when the FFT unit 133 performs the fast Fourier transform is the same as processing timings of the IFFT calculation units 112a and 112b. This is because a transmission time from when the communication controller 100 outputs a signal to when the signal is supplied to the FFT unit 133 is considerably short and is sufficiently within the guard interval, and accordingly, orthogonality after the fast Fourier transform is maintained.

The delay correction unit 140 illustrated in FIG. 7 converts the phase difference into a delay time and removes a delay by controlling the processing timings of the IFFT calculation units 112a and 112b. As a method for controlling timings, a method for adding an offset to an IFFT clock so that an IFFT start timing is set early or late may be employed.

Although the example suitable for the 2×2 MIMO is illustrated in FIG. 7, the process of this embodiment may be expanded to N×N MIMO (N is an integer equal to or larger than 2). In this case, the communication controller 100 illustrated in FIG. 7 includes N IFFT units, N orthogonal modulation units, and N high-frequency signal transmission paths, and the demodulation unit 170 includes N mixers. Then N reference signals for delay detection are assigned to the same frequency components in the same time slot of the IFFT units.

The delay detector 130 includes N analog/digital converters, and the division unit 132 performs division between the frequency component ref_F0 and the other (N−1) frequency components. By this, relative delays of the other paths (N−1 paths) relative to the high-frequency signal transmission path #0 can be obtained. Control of the delay times is performed on the individual N−1 IFFT units.

<2. Second Embodiment>

Figure 10:
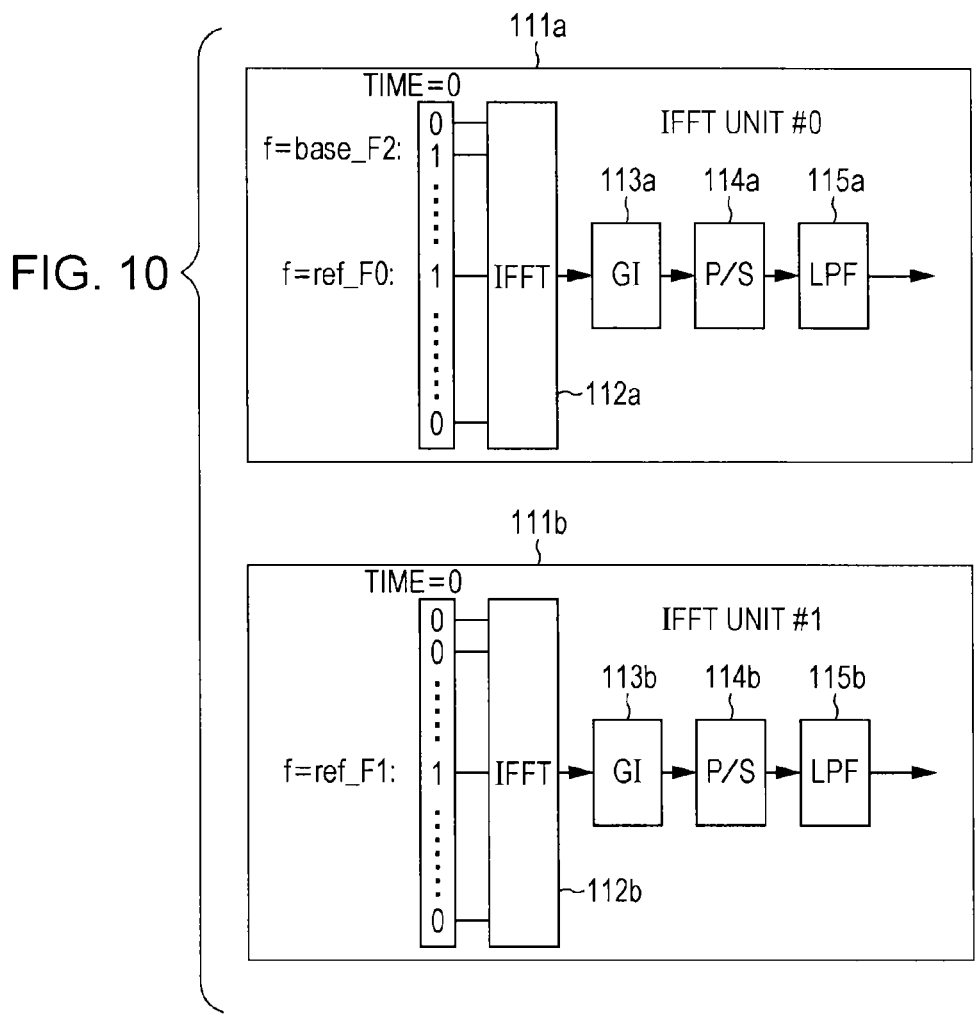
FIG. 10 includes block diagrams illustrating configurations of IFFT units according to a second embodiment of the present disclosure.
Figure 11:
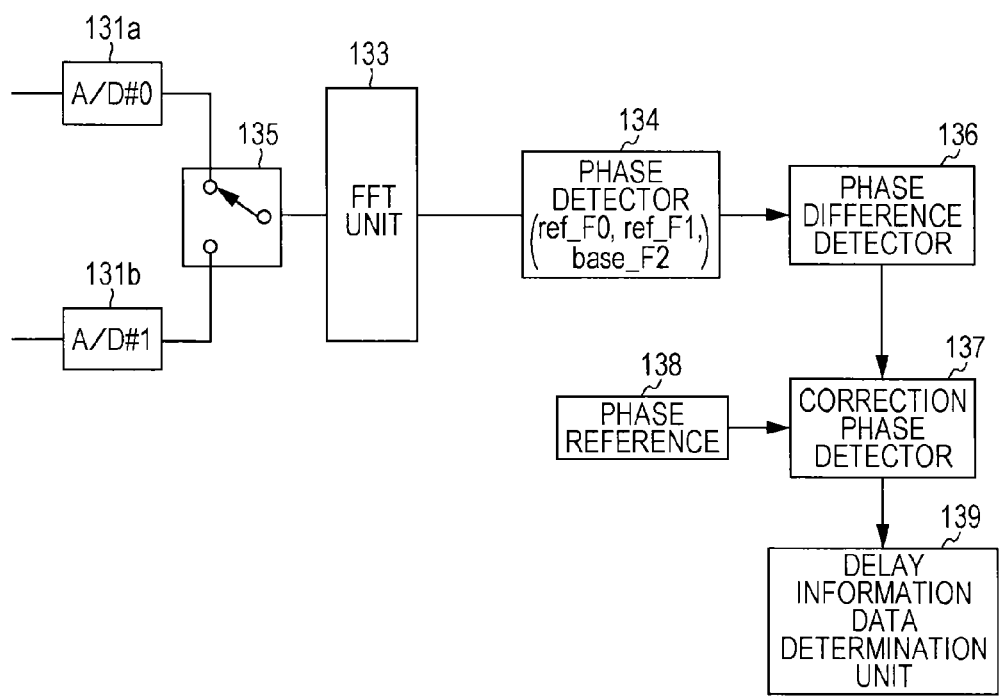
FIG. 11 is a block diagram illustrating a configuration of a delay detector according to the second embodiment of the present disclosure.
Figure 12:
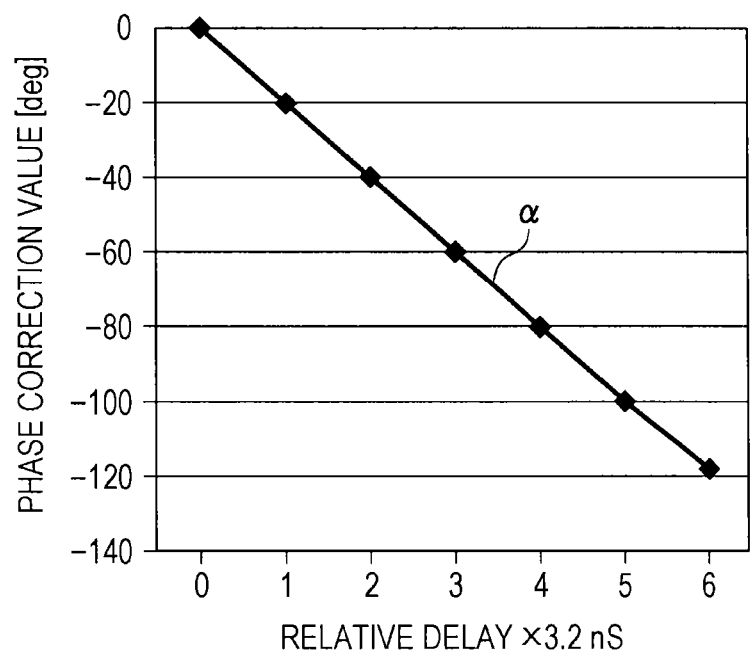
FIG. 12 is a diagram illustrating the relationship between a phase correction value and a relative delay according to the second embodiment of the present disclosure.

Next, a second embodiment of the present disclosure will be described with reference to FIGS. 10 to 12. In FIGS. 10 to 12, components the same as those illustrated in FIGS. 7 to 9 described in the first embodiment are denoted by reference numerals the same as those illustrated in FIGS. 7 to 9.

As with the first embodiment, according to the second embodiment of the present disclosure, a transmission apparatus which has two transmission paths #0 and #1 and which performs 2×2 MIMO transmission is provided. As an entire configuration of the transmission apparatus, the configuration illustrated in FIG. 7 is employed.

[2-1. Examples of IFFT Units]

FIG. 10 is a diagram illustrating two IFFT units 111a and 111b.

Configurations of the two IFFT units 111a and 111b are the same as those of the IFFT units 111a and 111b described above with reference to FIG. 8. However, signals supplied to IFFT calculation units 112a and 112b from a communication controller 100 are different from those illustrated in FIG. 8.

Specifically, at the time of delay detection, in the IFFT calculation unit 112a of the path #0, a reference signal for delay detection "1" is assigned to a predetermined frequency component ref_F0 and another frequency component base_F2, and a reference signal "0" is assigned to other frequency components. Furthermore, also in the IFFT calculation unit 112b of the path #1, the reference signal for delay detection "1" is assigned to a frequency component ref_F1 which is different from the predetermined frequency component ref_F0 and the frequency component base_F2, and the signal "0" is assigned to other frequency components. The reference signal "1" is assigned to the two paths #0 and #1 in the same time slot. The reference signals have the same amplitude.

[2-2. Example of Delay Detector]

FIG. 11 is a diagram illustrating a configuration of a delay detector 130 according to the second embodiment.

The delay detector 130 includes analog/digital converters 131a and 131b which individually convert baseband signals supplied from two mixers 171 and 172 of a demodulation unit 170 into digital signals. The signals subjected to the digital conversion performed by the analog/digital converters 131a and 131b are selectively supplied to a FFT unit 133 through a switch 135.

The FFT unit 133 sequentially performs the fast Fourier transform on an output of the digital/analog converter 131a and an output of the digital/analog converter 131b. The signal which has been subjected to the fast Fourier transform performed by the FFT unit 133 is supplied to a phase detector 134. The phase detector 134 detects a phase of the frequency component ref_F0, a phase of the frequency component ref_F1, and a phase of the frequency component base_F2 at respective timings including respective signal components.

Phase information of the three frequency components detected by the phase detector 134 is supplied to a phase difference detector 136. The phase difference detector 136 detects a phase difference from the phase information. Furthermore, the phase difference information detected by the phase difference detector 136 is supplied to a correction phase detector 137 which obtains a phase to be corrected using a reference phase stored by a phase reference generation unit 138 in advance and the phase difference detected by the phase difference detector 136. The phase value to be corrected calculated by the correction phase detector 137 is supplied to a delay information data determination unit 139 which determines delay information used to correct a transmission timing.

[2-3. Example of Delay Correction Operation]

Next, an operation of detecting a relative delay performed by the delay detector 130 will be described.

The phase detector 134 obtains phases of the three frequency components ref_F0, ref_F1, and base_F2 included in the signals which have been subjected to the fast Fourier transform performed by the FFT unit 133. When the following calculation is performed using the phases, a phase difference corresponding to a relative delay of the frequency component base_F2 is obtained.

$$\text{Phase Difference}=((\text{Phase of ref\_F1})-(\text{Phase of ref\_F0}))/((\text{ref\_F1})-(\text{ref\_F0}))\times((\text{base\_F2})-(\text{ref\_F0}))-(\text{Phase of base\_F2}) \quad \text{Equation (4)}$$

An object of the calculation equation of Equation (4) will be described as follows. Although information on a delay is included in the phase of the frequency component base_F2, a relative phase value between the paths #0 and #1 is required, and therefore, the frequency components ref_F0 and ref_F1 are used. Since an absolute value of a phase difference includes an offset of a transmission length, the phase of the frequency component base_F2 is interpolated or extrapolated using a difference of two waves of the frequency components ref_F0 and ref_F1. This calculation is performed by the phase difference detector 136.

Furthermore, when a delay amount is equal to or larger than one IFFT chip, a phase rotation exceeds 360 degrees, and therefore, the following calculation is performed in order to subtract an integral multiple thereof.

$$\text{Phase Correction Value}=\text{mod}((\text{Phase Difference})/(\text{Phase Reference})) \quad \text{Equation (5)}$$

Here, the following equation is used.

$$\text{Phase Reference}=(360\times\text{ref\_F0})/(\text{IFFT size}) \quad \text{Equation (6)}$$

In Equation (5), "mod" represents a residue of the division. The calculation of Equation (6) is performed by the correction phase detector 137. As the phase reference in Equation (6), a value obtained in advance is stored in the phase reference generation unit 138.

Since a phase correction value obtained by the correction phase detector 137 is thus converted into a time, a relative delay is obtained.

[2-4. Example of Correction of Relative Delay Using Phase Correction Value]

FIG. 12 is a diagram illustrating a result of simulation of this embodiment. In this example, it is assumed that an IFFT size is 200, the frequency component ref_F0 is 100, the frequency component ref_F1 is 110, and the frequency component base_F2 is 109. Assuming an example employing the LTE standard, a change characteristic a of a phase corresponding to a relative delay from 3.2 nS to 19.2 nS is shown.

In the change characteristic a, a phase delay is linearly increased along with increase of a relative delay. For example, a phase change of approximately 20 degrees is shown relative to a relative delay of 3.2 nS.

Note that, when values of the frequency components ref_F0 and ref_F1 are reduced, inclination of a line of the change characteristic a becomes approximately flat and resolution capability depending on a phase is deteriorated.

<3. Third Embodiment>

Next, a third embodiment of the present disclosure will be described with reference to FIGS. 13 to 16. In FIGS. 13 to 16, components the same as those illustrated in FIGS. 7 to 12 described in the first and second embodiments are denoted by reference numerals the same as those illustrated in FIGS. 7 to 12.

As with the first and second embodiments, according to the third embodiment of the present disclosure, a transmission apparatus which has two transmission paths #0 and #1 and which performs 2×2 MIMO transmission is provided.

[3-1. Example of Transmission Apparatus]

Figure 13:
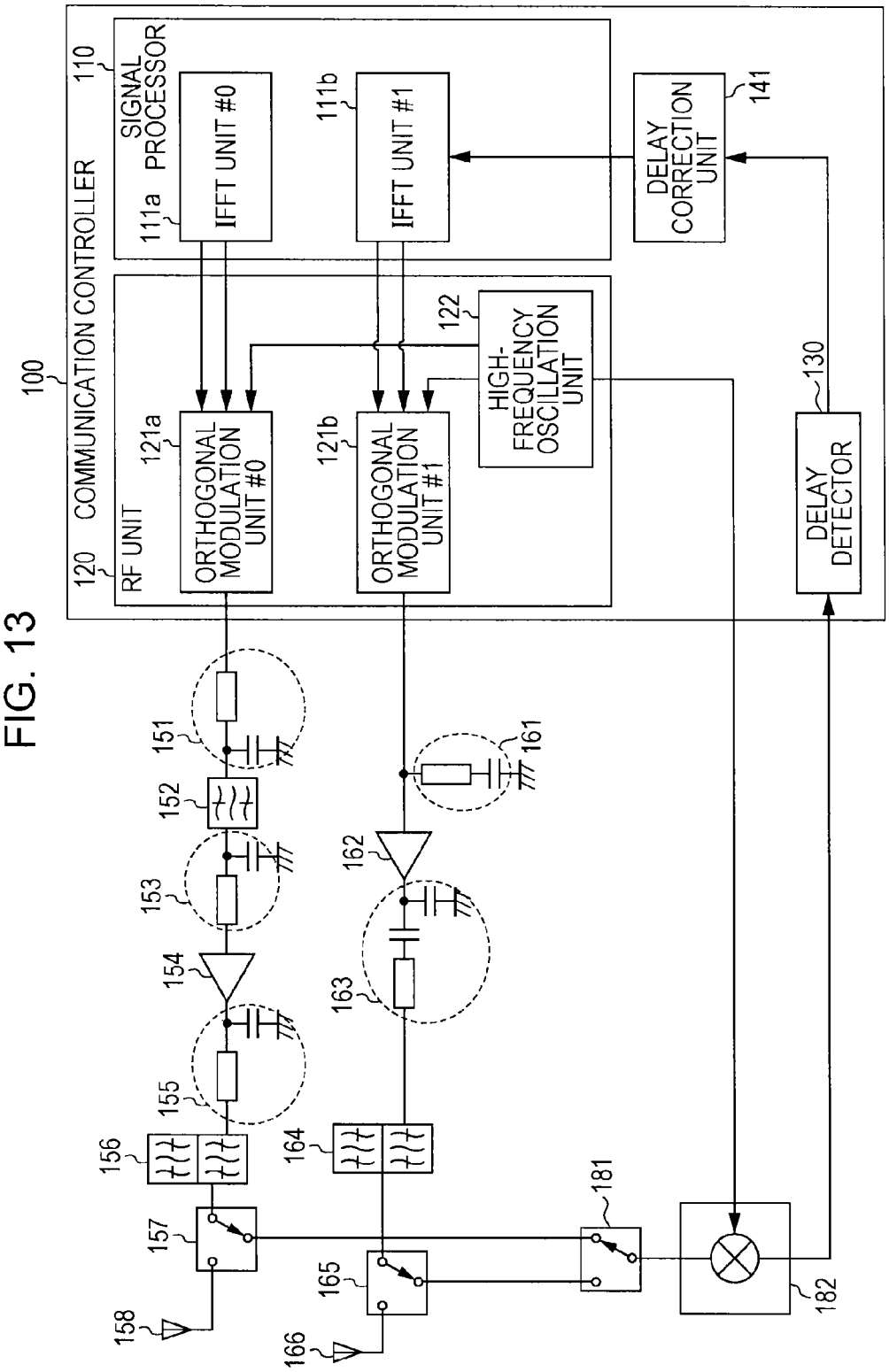
FIG. 13 is a block diagram illustrating a configuration of a transmission apparatus according to a third embodiment of the present disclosure.

FIG. 13 is a diagram illustrating a configuration of a transmission apparatus according to the third embodiment.

Configurations of the two transmission paths #0 and #1 included in the transmission apparatus of FIG. 13 are the same as those of the transmission apparatus of FIG. 7. However, arrays of signals supplied from IFFT units 111a and 111b are different from those illustrated in FIG. 7.

Then the transmission apparatus of the third embodiment has a configuration for detecting a delay of a transmission signal different from that of FIG. 7. Specifically, as with the case of FIG. 7, the transmission path #0 includes a switch 157 which performs switching on a transmission signal output from a duplexer 156, and the transmission path #0 includes a switch 165 which performs switching on a transmission signal output from a duplexer 165. Transmission signals for delay detection switched by the switches 157 and 165 are supplied to a switch 181. The switch 181 selects the transmission signal for delay detection of the transmission path #0 or the transmission signal for delay detection of the transmission path #1. The transmission signal for delay detection selected by the switch 181 is supplied to a demodulation unit 182. The demodulation unit 182 includes a mixer which mixes a high-frequency signal supplied from a high-frequency oscillation unit 122 of an RF unit 120 with the transmission signal for delay detection. By this process, the demodulation unit 182 demodulates the transmission signals of the transmission paths into baseband signals.

Figure 15:
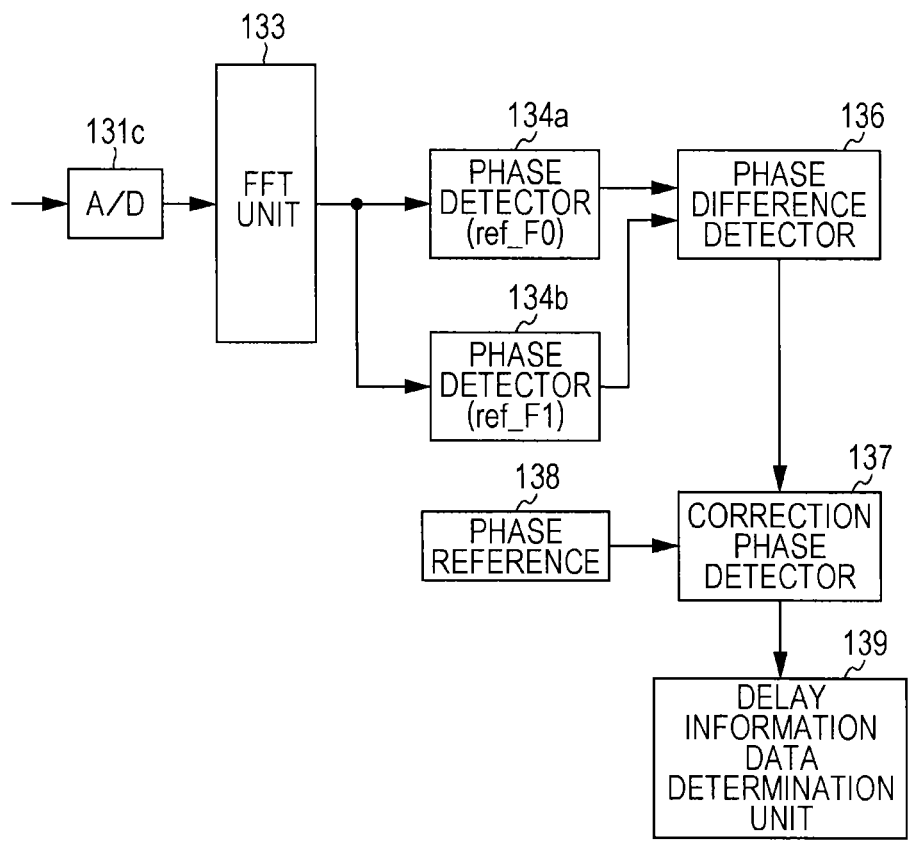
FIG. 15 is a block diagram illustrating a configuration of a delay detector according to the third embodiment of the present disclosure.

The signals of the transmission paths #0 and #1 demodulated by the demodulation unit 182 are supplied to a delay detector 130 of a communication controller 100. The delay detector 130 detects signals added to the transmission signals in order to detect a delay and detects a relative delay amount between the two transmission paths #0 and #1 in accordance with a detected phase difference between the signals. A configuration of the delay detector 130 of the third embodiment will be described hereinafter (FIG. 15).

Other portions of the transmission apparatus are configured the same as the transmission apparatus illustrated in FIG. 7.

[3-2. Examples of IFFT Units]

Figure 14:
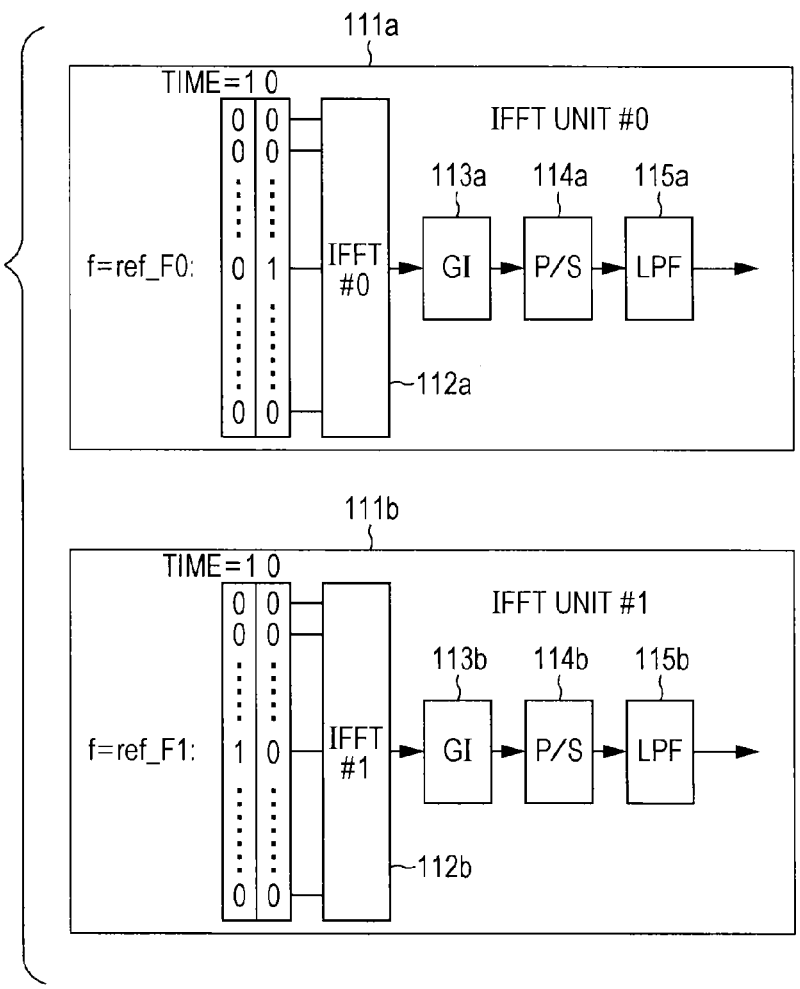
FIG. 14 includes block diagrams illustrating configurations of IFFT units according to the third embodiment of the present disclosure.

FIG. 14 is a diagram illustrating configurations of the two IFFT units 111a and 111b.

The configurations of the two IFFT units 111a and 111b are the same as those of the IFFT units 111a and 111b described above with reference to FIG. 8. However, signals supplied to IFFT calculation units 112a and 112b from the communication controller 100 are different from those illustrated in FIG. 8.

Specifically, at a time of delay detection, in a signal supplied to the IFFT calculation unit 112a of the path #0, a reference signal for delay detection "1" is assigned to a predetermined frequency component ref_F0 in a predetermined time slot and a reference signal "0" is assigned to other frequency components.

Furthermore, in a signal supplied to the IFFT calculation unit 112b of the path #1, the reference signal for delay detection "1" is assigned to a frequency component ref_F1 and the signal "0" is assigned to other frequency components. The time slot in which the reference signal "1" for delay detection is assigned in the path #0 and a time slot in which the reference signal "1" for delay detection is assigned in the path #1 are different from each other. For example, the time slot in which the reference signal is assigned in the path #1 is located adjacent to the time slot in which the reference signal is assigned in the path #0.

[3-3. Example of Delay Detection Unit]

FIG. 15 is a diagram illustrating a configuration of the delay detector 130 according to the third embodiment.

The delay detector 130 includes an analog/digital converter 131c which converts a baseband signal supplied from the demodulation unit 182 into a digital signal. The analog/digital converter 131c has a timing when the signal for delay detection of the path #0 is supplied and a timing when the signal for delay detection of the path #1 is supplied.

The signal subjected to the digital conversion performed by the digital/analog converter 131c is supplied to an FFT unit 133.

The signal which has been subjected to the fast Fourier transform performed by the FFT unit 133 is supplied to two phase detectors 134a and 134b. The phase detector 134a detects a phase of the frequency component ref_F0 at the timing when the reference signal for delay detection is assigned. The phase detector 134b detects a phase of the frequency component ref_F1 at the timing when the reference signal for delay detection is assigned.

Then phase information of the two frequency components detected by the phase detectors 134a and 134b is supplied to a phase difference detector 136. The phase difference detector 136 detects a difference between the two phases. Information on the phase difference detected by the phase difference detector 136 is supplied to a correction phase detector 137 which obtains a phase to be corrected using a reference phase stored by a phase reference generation unit 138 in advance and the phase difference detected by the phase difference detector 136. The phase value to be corrected calculated by the correction phase detector 137 is supplied to a delay information data determination unit 139 which determines delay information used to correct a transmission timing.

[3-4. Example of Delay Correction Operation]

Next, an operation of detecting a relative delay performed by the delay detector 130 will be described.

The phase difference detector 136 obtains information on the phases of the two frequency components ref_F0 and ref_F1 included in the signal which has been subjected to the fast Fourier transform performed by the FFT unit 133. The phase difference detector 136 obtains a phase difference between the two frequency components in accordance with the Equation (7) below.

Phase Difference=(Phase of ref_F0)−(Phase of ref_F1)   Equation (7)

Then the correction phase detector 137 performs a calculation process the same as that of the second embodiment, that is, the calculations of Equations (5) and (6) described above, using the obtained phase difference. By performing the calculations of Equations (5) and (6), rotation of a phase difference of 360 degrees or more is removed. Furthermore, the correction phase detector 137 converts the phase difference into a time as determination of data for correction information so as to obtain a correction value of a timing of the IFFT. The correction phase detector 137 generates a signal used to correct a relative delay by converting a phase correction value obtained using the correction value into a time.

Note that the delay correction operation is an example of that performed by a communication apparatus having the two paths #0 and #1. On the other hand, the third embodiment may be expanded to a case of N×N MIMO (N is an integer). In this case, the communication controller 100 includes N IFFT units and N orthogonal modulation units, the RF unit 120 includes N paths, and the switch 181 connected to the demodulation unit 182 is configured as N-input-1-output. N reference signals are assigned to the same frequency components in different time slots in the IFFT units. In the delay detector 130, the phase detectors which have performed the FFT extract phases of the N reference signals.

The subtraction of Equation (7) is performed between the first frequency component ref_F0 assigned to the signal of the path #0 and frequency components assigned to the other (N−1) paths. By this, the delay detector 130 obtains relative delays of the (N−1) paths relative to the RF unit of the path #0. Control of the delay times is performed on the individual (N−1) IFFT units.

[3-5. Example of Correction of Relative Delay Using Phase Correction Value]

Figure 16:
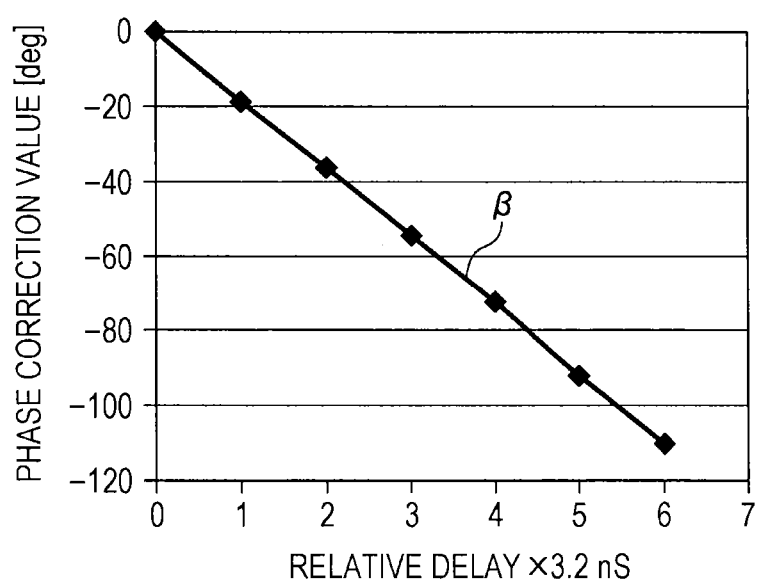
FIG. 16 is a diagram illustrating the relationship between a phase correction value and a relative delay according to the third embodiment of the present disclosure.

FIG. 16 is a diagram illustrating a result of simulation of this embodiment. Conditions for the simulation of FIG. 16 are the same as those of FIG. 12.

It is assumed that a number 10 of a frequency component is assigned to ref_F0 and base_F1. Furthermore, an IFFT size is 200. A change characteristic β illustrated in FIG. 16 represents a characteristic in which a phase delay is increased as a relative delay is increased. In this embodiment, a phase change of approximately 20 degrees is shown relative to a relative delay of 3.2 nS. Accordingly, also in the third embodiment, a result substantially the same as that of the second embodiment is obtained.

<4. Modifications>

Note that the foregoing description discloses the simplest MIMO system in which a transmission apparatus performs transmission using two transmission paths. However, the examples of the present disclosure may be applied to an MIMO system including a larger number of transmission paths and a larger number of reception paths. Specifically, the examples of the present disclosure may be applied to a transmission apparatus having N transmission paths (N is an integer equal to or larger than 2). For example, when N transmission paths are provided, relative delays between one of the transmission paths and the others of the transmission paths may be detected and transmission timings of the transmission paths may be corrected in accordance with detection amounts of the relative delays.

Furthermore, the configurations and the processes described in the claims of the present disclosure are not limited to the foregoing embodiments. It is understood that it is apparent for those skilled in the art that various modifications, combinations, and other embodiments may be made in terms of design and other elements within the scope of the claims and equivalents of the claims

The invention claimed is:

1. An electronic device comprising:
circuitry configured to
perform an inverse fast Fourier transform (IFFT) on N (N is an integer equal to or larger than 2) orthogonal frequency-division multiplexed (OFDM) transmission signals by IFFT circuitry of the circuitry;
perform a fast Fourier transform (FFT) on the N transmission signals which have been subjected to the IFFT;
detect phases of the N transmission signals which have been subjected to the FFT;

switch the N transmission signals away from a transmission antenna to form a feedback path between the IFFT circuitry and delay detector circuitry of the circuitry;

detect, by the delay detector circuitry, relative delay amounts of the N transmission signals from the feedback path based on the detected phases of the N transmission signals; and adjust a timing at which at least one of the N transmission signals is subjected to the inverse fast Fourier transform based on the detected relative delay amounts.

2. The electronic device of claim 1, wherein the circuitry is configured to supply, to N antenna elements, the N transmission signals which have been subjected to the IFFT.

3. The electronic device of claim 1, wherein
reference signals are included in a same frequency component and a same time slot of each of the N transmission signals, and
the circuitry is configured to detect the relative delay amounts based on the reference signals included in the N transmission signals.

4. The electronic device of claim 1, wherein the circuitry is configured to perform N−1 division calculations on the N transmission signals and perform the FFT on an result of the N−1 division calculations.

5. The electronic device of claim 1, wherein the circuitry is configured to
demodulate the N transmission signals;
perform a division calculation on the N transmission signals; and
perform the FFT on a result of the division calculation.

6. The electronic device of claim 1, wherein
reference signals are included in a same time slot of a first transmission signal and a second transmission signal,
the first transmission signal includes reference signals at a first frequency component (f0) and a second frequency component (f2) in the same time slot, and
the second transmission signal includes a reference signal at a third frequency component (f1) in the same time slot.

7. The electronic device of claim 6, wherein the circuitry is configured to detect a phase difference between the first transmission and the second transmission signal according to the following formula:

Phase Difference=[((Phase of f1)−(Phase of f0))/ f1-f0]×(f2-f0) −(Phase of f2).

8. The electronic device of claim 7, wherein the circuitry is configured to obtain a phase reference according to the following formula:

Phase Reference =(360 ×f0)/IFFT size.

9. The electronic device of claim 8, wherein the circuitry is configured to adjust the timing based on a phase correction value which is obtained according to the following formula:

Phase Correction Value=mod(Phase Difference/Phase Reference), wherein mod denotes a residue of the division between the phase difference and the phase reference.

10. The electronic device of claim 1, wherein reference signals are assigned to a same frequency component but different successive time slots in the N transmission signals.

11. The electronic device of claim 10, wherein the circuitry is configured to successively subject each of the N transmission signals to the FFT.

12. The electronic device of claim 11, wherein the circuitry is configured to successively detect the relative delay amounts of the N transmission signals from differences between the N transmission signals that have successively been subjected to the FFT and a reference phase.

13. A method performed by an electronic device, the method comprising:

performing an inverse fast Fourier transform (IFFT) on N (N is an integer equal to or larger than 2) orthogonal frequency-division multiplexed (OFDM) transmission signals by IFFT circuitry of the electronic device;

performing a fast Fourier transform (FFT) on the N transmission signals which have been subjected to the IFFT;

detecting, by circuitry of the electronic device, phases of the N transmission signals which have been subjected to the FFT;

switching the N transmission signals away from a transmission antenna to form a feedback path between the IFFT circuitry and delay detector circuitry of the electronic device;

detecting, by the delay detector circuitry, relative delay amounts of the N transmission signals from the feedback path based on the detected phases of the N transmission signals; and adjusting, by the circuitry, a timing at which at least one of the N transmission signals is subjected to the inverse fast Fourier transform based on the detected relative delay amounts.

14. The method of claim 13,
reference signals are included in a same frequency component and a same time slot of each of the N transmission signals, and
the relative delay amounts are detected based on the reference signals included in the N transmission signals.

15. The method of claim 13, wherein
reference signals are included in a same time slot of a first transmission signal and a second transmission signal,
the first transmission signal including reference signals at a first frequency component (f0) and a second frequency component (f2) in the same time slot, and
the second transmission signal including a reference signal at a third frequency component (f1) in the same time slot.

16. The method of claim 15, further comprising:
detecting a phase difference between the first transmission and the second transmission signal according to the following formula:

Phase Difference=[((Phase of f1) −(Phase of f0))/ f1- f0]×(f2-f0) −(Phase of f2);

obtaining a phase reference according to the following formula:

Phase Reference =(360×f0)/IFFT size; and adjusting the timing based on a phase correction value which is obtained according to the following formula:

Phase Correction Value =mod(Phase Difference/Phase Reference), wherein mod denotes a residue of the division between the phase difference and the phase reference.

17. The method of claim 13, wherein reference signals are assigned to a same frequency component but different successive time slots in the N transmission signals, and the method further comprises:

successively subjecting each of the N transmission signals to the FFT; and successively detecting the relative delay amounts of the N transmission signals from differences between the N transmission signals that have successively been subjected to the FFT and a reference phase.

* * * * *